Sept. 7, 1943.    R. E. LORENZEN    2,328,730
AIRCRAFT ATTITUDE AND LEVEL INDICATING INSTRUMENT
Filed June 28, 1941    2 Sheets-Sheet 1

INVENTOR.
ROGER E. LORENZEN
BY Earl + Chappell
ATTORNEYS.

Sept. 7, 1943.  R. E. LORENZEN  2,328,730
AIRCRAFT ATTITUDE AND LEVEL INDICATING INSTRUMENT
Filed June 28, 1941 2 Sheets-Sheet 2

INVENTOR.
ROGER E. LORENZEN
BY Earl & Chappell
ATTORNEYS.

Patented Sept. 7, 1943

2,328,730

UNITED STATES PATENT OFFICE 2,328,730

AIRCRAFT ATTITUDE AND LEVEL INDICATING INSTRUMENT

Roger E. Lorenzen, Niles, Mich.

Application June 28, 1941, Serial No. 400,273

10 Claims. (Cl. 33—215)

This invention relates to improvements in Aircraft attitude and level indicating instrument.

The main objects of this invention are:

First, to provide an instrument for simultaneously indicating to the pilot of an aeroplane the behavior of his ship in level flight, turning, climbing and descending.

Second, to provide an instrument of the foregoing type which is of simple, inexpensive construction, having means for indicating error in the banking or turning of an aircraft as well as the position of the wings in level flight, and for indicating at the same time whether or not the craft is climbing, descending or pursuing a proper, straight-line, horizontal course.

Third, to provide an instrument of the foregoing type which, because of its fool-proof character and the simplicity of reading and interpreting the indications thereof, is admirably adapted for use in teaching flying students.

Fourth, to provide an instrument of the type described which promotes a quick analysis of a student's faults in correlating the control of the ailerons and rudder, thereby expediting mastery of this difficult part of flying instructions, and which enables experienced fliers to detect and correct theretofore unnoticed faults in their flying habits.

Fifth, to provide a simple, inexpensive instrument of the type described which is readily installable on all existing types of aircraft.

The present invention relates to an instrument performing the functions of an inclinometer to indicate the angle of climbing or descent of an aircraft, and an "artificial horizon," which instrument is admirably adapted as an instruction mechanism for teaching students to fly correctly. As such it clearly shows to the student the relationship of rudder to ailerons, or wing to stick, enabling the student to learn at an early stage the art of making perfect turns and to prevent him from developing bad habits regarding rudder and stick coordination. It is likewise valuable as a blind flying instrument and enables even experienced pilots to correct unsuspected faults existing in their flying habits.

The natural horizon is used by the pilot as a reference to keep the plane in normal desired height, however during poor visibility even the professional pilot, relying on his own senses, can only guess as to whether he is flying correctly. The student or private pilot, because of lack of experience, is even less able to ascertain whether he is correct and consistent in his maneuvers. He may believe that he is flying straight and level, whereas in reality he is gaining or losing altitude or has a wing down. At one time he may climb or descend on a low angle and at another on a high, and in turning he may be slipping or skidding without realizing it, or unconsciously climbing or diving. The instrument of my invention enables the pilot to readily diagnose the cause of and ascertain the method of correcting all of these errors.

Further objects relating to details and economies of my invention will appear from the description to follow. The invention is defined in the claims.

A structure embodying the features of my invention is illustrated in the accompanying drawings, wherein.

In describing the present instrument, the operating mechanism thereof will first be described, after which reference will be had to the manner of employing the same in actual usage.

Figure 1:
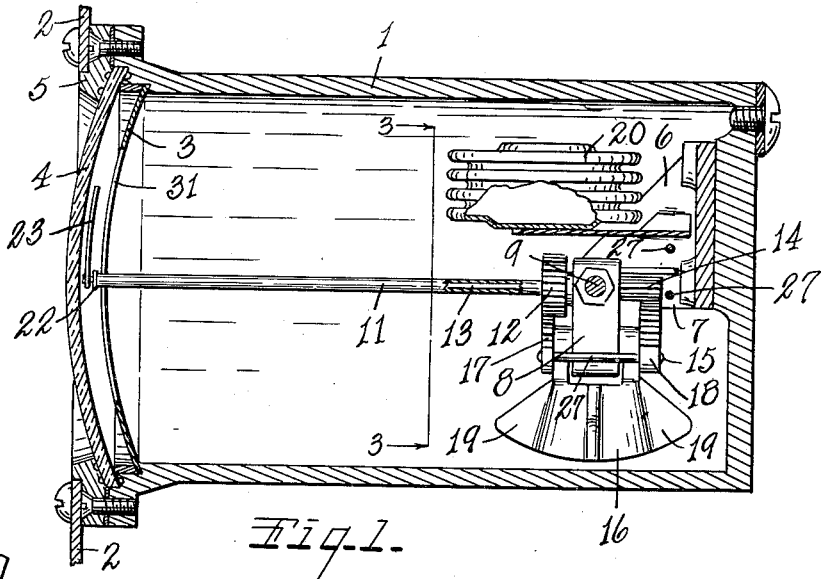
Fig. 1 is a fragmentary view in vertical longitudinal section illustrating the instrument of my invention as installed on the instrument panel of an aeroplane.
Figure 2:
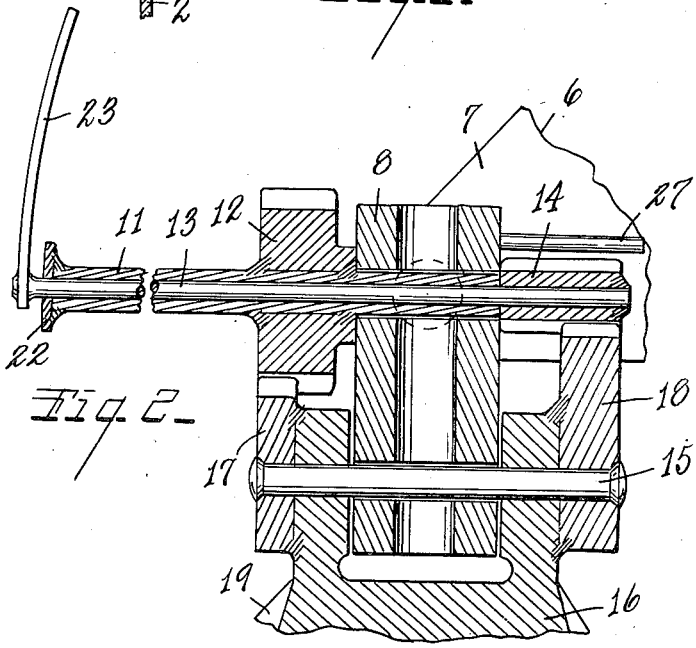
Fig. 2 is an enlarged fragmentary view in section on a line corresponding to line 2—2 of Fig. 3.
Figure 3:
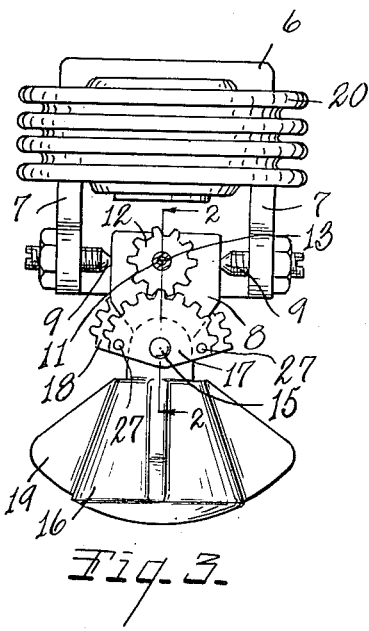
Fig. 3 is a view in section on a line corresponding to line 3—3 of Fig. 1 illustrating the construction and relation of parts of the operating mechanism of my instrument.

Referring to the drawings reference numeral 1 of Fig. 1 designates an elongated cylindrical, liquid-tight casing which is suitably secured to the instrument panel 2 of the aircraft, the front end of the casing being provided with a dial 3 to be hereinafter described in detail and a transparent cover 4 secured thereover by a clamping ring 5, it being understood that the cover connection is liquid tight to prevent leaking of the liquid with which the interior of the casing 1 is preferably filled. At the rear end thereof the casing is provided with a forwardly projecting, supporting bracket 6 having two laterally spaced forks 7 (see Fig. 3) in which a block 8 is pivoted by means of the nicely adjustable, relatively frictionless pivots 9, which are threadedly carried by the forks 7 of the bracket. Thus block 8 is freely swingable on its pivots in a plane extending longitudinally of the axis of the casing, longitudinally of and parallel to the length of the plane, as will be understood.

The block 8 serves as a rotatable mounting for an elongated, hollow, tubular shaft 11 extending lengthwise coaxial of casing 1 and through an opening in the dial 3 to be hereinafter referred to. This hollow shaft has secured thereon, forwardly of block 8 a gear 12 and interiorly thereof the shaft rotatably receives a further elongated shaft 13 of solid section. Shaft 13 extends through block 8 and on the rear side thereof is provided with a gear 14, it being noted that the latter is substantially smaller than the gear 12 forwardly of the block for a purpose to be described.

Block 8 has a bearing extending longitudinally therethrough journaling a pivot pin 15 on which a counterpoise or weight 16 is secured, whereby the weight 16 pivotally depends below block 8 for swinging movement laterally of the casing 1, hence at right angles to the plane of pivotal movement of the block 8 itself. Weight 16 is provided with front and rear toothed segments 17, 18, meshing with the gears 12, 14, respectively, it being understood that the segments 17, 18 are in fixed relation to the weight. The weight 16 is provided with laterally and longitudinally projecting wings or flanges 19, the purpose of which is to increase the friction resisting movement of the weight in the liquid of the casing, either longitudinally thereof with block 8 or laterally thereof on the block 8, thereby eliminating or absorbing excessive looseness and damping the action of the instrument.

Bracket 6 carries a hollow corrugated metal bellows 20 which flexes to compensate for expansion and contraction of the liquid with which the casing 1 is filled, it being understood that the casing, when filled, is otherwise entirely filled so that no air is present therein. The liquid filling the casing has extremely little expansion and contraction under normal atmospheric temperature conditions being preferably a clear, hydraulic brake fluid; however, whatever changes in volume occur are absorbed or compensated for by bellows 20.

Figure 4:
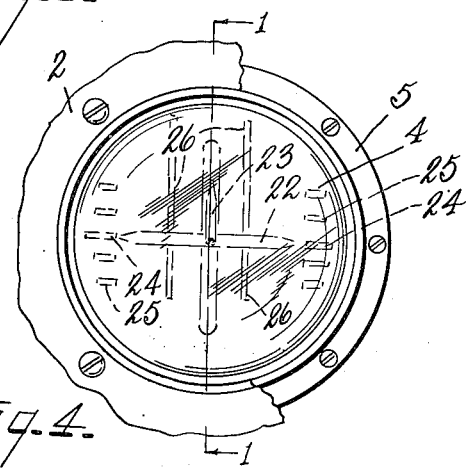
Fig. 4 is a fragmentary, front view illustrating the dial of my instrument exposed on the instrument panel and Figs. 5 to 9, inclusive, are diagrammatic views illustrating various positions of the indicator relative to the dial of my invention and demonstrating its operation in indicating to the pilot the course of his ship.

Referring to Fig. 4, likewise the diagrammatic views of Figs. 5–9, inclusive, the dial 3 of the instrument is provided with an elongated slot or aperture 31 through which the forward end of the hollow shaft 11 projects. This hollow shaft has secured thereto, forwardly of dial 3, the horizontal indicator bar 22. The solid shaft 13, which is internally concentric of and carried by shaft 11, projects forwardly of the latter slightly and has an indicator finger or pointer 23 secured thereto. The indicator bar 22 extends on either side of the elongated slot 31, being in normal, level, straight-line flight at exactly 90° to the latter, while indicating finger 23 is normally disposed at exactly 90° to the bar when the ship is properly maneuvered either in straight-line flight or in turning climbing or descending. It will be appreciated that both the bar 22 and the finger 23 have angular movement imparted thereto as the ship is maneuvered inasmuch as each is mounted on a shaft controlled by a gear thereon meshing respectively with the segments on the swingable weight or counterpoise 16, the latter responding to the pull of gravity and centrifugal force thereon.

The dial 3 of the instrument has two relatively heavy and readily visible marks or graduations 24 on its face at either side of the normal horizontal position of indicator bar 22. Spaced directly above and below these graduations on the right and lefthand side of the dial are the finer graduations 25, while at either side of and equally spaced from and parallel to the slot 31, I provide vertical lines 26 which are used for the pilot's convenience in gauging the side to side movement of the vertical finger 23.

In operation, for a given lateral swinging movement of weight 16 caused by improper maneuvering, the movements of the finger 23 and bar 22, though in the same angular direction, are unequal because of the difference in size of the gears 12, 14. In an actual instrument the ratio of the gear 12 to its actuating segment 17 is 1.8 to 1, while the ratio between the gear 14 controlling vertical finger 23 to its actuating segment 18 is 6 to 1. This means that, for an improper banking of the ship in turning, for example, both the bar and finger will rotate in one direction or the other but that the movement of the finger will be greater in the foregoing proportion. When the bank is properly executed neither the finger nor bar will move either relative to one another or to the dial 3, assuming that no change in altitude of the ship takes place such as would swing the block 8 longitudinally of the axis of the casing. The reasons for this will be hereinafter described.

In operation it is convenient to assume that the vertical finger 23 represents the control stick and the horizontal bar 22 represents the wings of the aeroplane. If the vertical finger moves to one side of a parallel position between the two fixed gauge lines 26, it means that the control stick of the aeroplane is off center and, to correct the error being made, must be moved in the opposite direction until the vertical instrument finger 23 is centered parallel to these lines. When the vertical finger shows a displacement in one direction the horizontal bar 22 also departs from linear relation to the graduations 24 at either end thereof, signifying that the corresponding wing is too low or high, regardless of what maneuver is being executed and that the aeroplane is not following a true path, curved or straight. The reason for this is that the counterweight, which governs the movement of segments 17, 18, hence the movement of gears 12, 14 and the bar 22 and finger 23 respectively, responds, in assuming its stable position, to the resultant of the gravity and centrifugal forces exerted thereon. Should the bank in turning, for example, be too slight for the speed the weight 16 will swing laterally to an excess in one direction, thereby rotating gears 12, 14 in the opposite direction and displacing finger 23 and bar 22 from their normal position parallel to gauge lines 26 and graduations 24, respectively. Should the bank be properly executed the forces acting on weight 16 balance so as to maintain the same equilibrium. Hence, since no movement of either the finger 23 or bar 22 takes place, the pilot or student by glancing at the instrument can ascertain that he has executed the maneuver properly.

Flying requires proper coordination of both rudder and stick controls regardless of the maneuver being executed and my instrument indicates by the vertical finger 23 the instant the control stick must be moved, either right or left, when too little stick has been applied in relation to the amount of rudder applied. If the stick movement is in proper coordination with the rudder movement the vertical finger will be centered parallel to the vertical lines on the dial.

Figure 9:
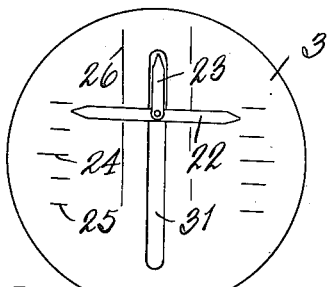

Assuming a straight, level flight, the horizontal bar 22 remains co-lineal with the two graduations 24, however if the aeroplane assumes a climbing or descending attitude, then weight 16 swings longitudinally in one direction or the other relative to the casing 1 and the horizontal bar 22 shifts upwardly or downwardly in slot 31 an amount appropriate to the angle of climb or descent. The direction of swing corresponds to the vertical inclination of the ship, i. e., up for a climb and down for a descent, due of course to the fact that dial 3 moves downwardly relative to the weight and to shafts 11, 13 for a climb and upwardly for a descent. Thus the vertical movement of bar 22 is in direct relation to the back and forth movement of the stick. Such action is illustrated in Fig. 9. Graduations 25 may be properly calibrated to indicate the exact amount of the relative movement. This vertical movement in the slot takes place regardless of whether the climb or descent is made in straight line flight or during a turn or bank. The angular and vertical movement of the shafts is limited by stops 27 inside the casing coacting with the weight and associated parts.

When the aeroplane skids, the error is due to the fact that the aeroplane is not banked steep enough for the sharp turn which is being attempted. Thus, in skidding while making a left hand turn, the vertical finger 23 will immediately move to the right as I have indicated in Fig. 7, and the horizontal bar 22 will drop slightly below the graduations 24 at its right hand end. This means that the stick must be moved to the left in order to raise the right wing slightly, so that the bank will be in proportion to the amount of rudder being applied, thereby enabling the turn to be made correctly. As the stick is moved to the left, the vertical finger 23 will move in the same direction approaching parallelism with the slot 31 and gauge lines 26, as well as a normal right angle relationship with the bar 22. When the hands are in this relation the stick may be held in the final position to continue a perfect turn.

Figure 5:
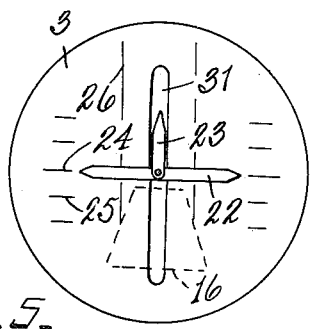
Figure 6:
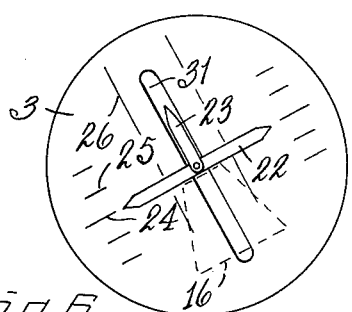
Figure 7:
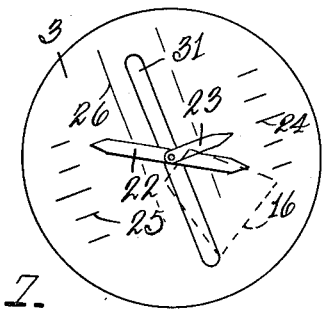
Figure 8:
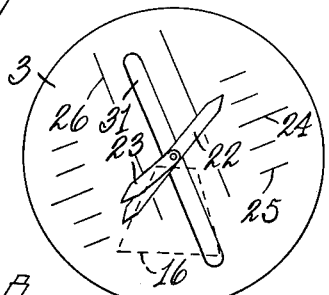

In Fig. 5, I have diagrammatically illustrated the relation of the finger and bar to one another and to the dial for perfect level flight. In Fig. 6, the relationship for a perfect bank to the left is shown.

When the aeroplane slips, the error is due to the fact that the ship is banked too steep for the turn attempted. Thus in slipping while making a left hand turn, vertical finger 23 will immediately move to the left, as in Fig. 8, and the horizontal bar 22 will drop below the graduations 24 at its left end. This means that the stick must be moved to the right in order to raise the left wing and bring the bank in proper proportion to the amount of rudder being applied. As this happens the finger approaches proper relation to the bar and the stick may be held in the final position to continue the turn.

It is apparent that these reactions of the finger and bar in their angular movement take place solely as a result of the centrifugal force on weight 16. If there is too much rudder and not enough bank the centrifugal force overcomes gravitation and unbalances the indicating element, while the reverse takes place when there is excessive banking for the rudder. By glancing at vertical finger 23, the student has an instantaneous correct suggestion or indication as to how he must manipulate the stick to correct the faulty maneuver, while observation of the bar 22 shows him how the position of his wings departs from the theoretically perfect condition in bank. The reading is a compound one, the angle of ascent or descent of the ship being clearly visible. This graphic character of my instrument is of the utmost importance in facilitating the teaching of flying.

Other than for use in teaching, my instrument is of outstanding use in blind flying when atmospheric conditions are such that the pilot cannot see the horizon or ground at times. The instrument keeps the pilot out of disastrous trouble when flying blind by helping him keep straight and level and by aiding in the making of perfect turns should he desire to change his course.

A factor of great significance is that my instrument is exceedingly simple and inexpensive in construction and is capable of production well below the price limit which can be afforded by the average private flier. Notwithstanding this, the instrument is sensitive and accurate.

An embodiment of the invention which incorporates the principles of the invention in a highly desirable manner has been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. An instrument for aircraft of the type described, comprising a fixture adapted to be mounted in predetermined position on said craft, having a support pivotally mounted thereon on a horizontal axis transverse the length of the craft, a weight pivotally mounted on said support on an axis longitudinal of the length of the craft for swinging movement laterally of the same under the influence of gravity or centrifugal force in maneuvering, indicator members actuated by said support for swinging movement as a unit in a plane longitudinal of the length of the craft, actuator means on said weight shiftable therewith in the movement thereof, and individual actuated members connected respectively to said indicator members and drivingly connected to said actuator means in different drive ratios, whereby the movements of said indicator members are unequal.

2. A combined attitude and angle of climb or descent indicating instrument for aircraft comprising a casing adapted to be positioned on the craft with its axis parallel to the length thereof, a support pivotally mounted internally of said casing for swinging movement in a vertical plane longitudinal to the axis thereof, said support having rotatably journaled thereon a pair of external and internal elongated, concentrically telescoped shafts extending longitudinally of the casing, said shafts being provided with individual actuated members secured respectively thereto, a weight pivotally mounted on said support for lateral swinging movement under centrifugal force transverse the plane of swinging movement of the support, said weight being provided with a pair of actuator members drivingly connected respectively with said actuated members on the respective shafts whereby lateral centrifugal or gravitational swinging movement of said weight relative to said support results in simultaneous rotation of said shafts during certain maneuvering of the craft, longitudinal swinging movement of the support producing vertical swinging movement of the shafts as a unit in the plane of pivotal movement of the support, a dial on said casing having an elongated aperture in the plane of swinging movement of the shafts through which said shafts project and along which the same travel in the vertical swinging movement thereof, said shafts being provided respectively with individual indicating means rotatable with reference to the dial when said shafts are rotated about their axes, said actuator having different drive ratios to the respective shaft rotating actuated members whereby the angular movement of said indicating members attached to he respective shafts is unequal.

3. A combined attitude and angle of climb or descent indicating instrument for aircraft comprising a casing adapted to be positioned on the craft with its axis parallel to the length of the craft, a support pivotally mounted in said casing for swinging movement in a vertical plane parallel to the length of the craft, said support having journaled thereon a pair of shafts extending longitudinally of the casing, a weight pivotally mounted on said pivoted support on an axis parallel to the axes of said shafts for lateral swinging movement transverse the plane of swinging movement of the support, drivingly connected driving and driven means respectively on said weight and said shafts, the drive ratio of the weight driving means to the driven means for one shaft differing from that for the other whereby lateral unbalanced centrifugal or gravitational swinging movement of said weight results in simultaneous, unequal rotation of said shafts, longitudinal swinging movement of the support in said longitudinal plane producing similar vertical swinging movement of the shafts as a unit, a dial on said casing having an elongated aperture parallel with said plane through which said shafts project and along which the same travel, said shafts being provided with individual indicating means rotatable with reference to the dial when said shafts are rotated.

4. A combined attitude and angle of climb or descent indicating instrument for aircraft comprising a fixture adapted to be positioned on the craft, a support pivotally mounted on said fixture for swinging movement in a vertical plane parallel to the length of the craft, said support having journaled thereon a pair of shafts extending longitudinally of the craft, a weight pivotally mounted on said pivoted support on said axis parallel to the axes of said shafts for lateral swinging movement transverse the plane of swinging movement of the support, drivingly connected driving and driven means respectively on said weight and said shafts, the drive ratio of the weight driving means to the driven means for one shaft differing from that of the other whereby lateral unbalanced centrifugal or gravitational swinging movement of said weight results in simultaneous, unequal rotation of said shafts, longitudinal swinging movement of the support in said longitudinal plane producing similar vertical swinging movement of the shafts as a unit, a dial having an elongated aperture parallel with said plane through which said shafts project and along which the same travel, said shafts being provided with individual indicating means rotatable with reference to the dial when said shafts are rotated.

5. A combined attitude and angle of climb or descent indicating instrument for aircraft comprising a casing adapted to be mounted in predetermined position on the craft and having an oscillating support pivotally mounted therein on a horizontal axis transverse the length of the craft for swinging movement in a longitudinal plane, said support having a weight pivotally mounted thereon on an axis parallel to the length of the craft for movement to a dynamically balanced condition under centrifugal and gravitational forces, and a pair of shafts extending longitudinally of the casing and journaled for rotation on said support, the axes of said shafts being parallel to the axis of said weight on the support, said shafts having drive members fixed respectively thereto and the weight having drive members secured thereto and drivingly connected respectively with said shaft. members whereby lateral swinging of the weight to a dynamically balanced position in certain maneuvering of the craft results in rotation of said shafts, the drive ratios of said respective drivingly connected shaft and weight members being different whereby the shaft motions are unequal, said shafts moving with said support when the latter swings in said longitudinal plane and having indicating members thereon visually indicating the vertical position and angular relationship of the shafts resultant from swinging of said support and weight thereon.

6. A combined attitude and angle of climb or descent indicating instrument for aircraft comprising a fixture adapted to be mounted in predetermined position on the craft and having an oscillating support pivotally mounted thereon on a horizontal axis transverse the length of the craft for swinging movement in a longitudinal plane, said support having a weight pivotally mounted thereon on an axis transverse the axis of the support, coaxial outer and inner telescoped rotatable shafts extending longitudinally of the craft, said shafts being connected to said support for swinging movement in a longitudinal plane in response to swinging movement of the support, the weight having drive means thereon and the shafts having individual driven means drivingly connected respectively to the weight drive means whereby lateral swinging of the weight to a dynamically balanced condition in certain maneuvering of the craft results in rotation of said shafts, the drive ratios of said weight drive to said respective driven means being different whereby the shaft motions are unequal.

7. A combined attitude and angle of climb or descent indicating instrument for aircraft comprising a fixture adapted to be mounted in predetermined position on the craft and having an oscillating support pivotally mounted thereon on a horizontal axis transverse the length of the craft for swinging movement in a longitudinal plane, said support having a weight pivotally mounted thereon on an axis transverse the axis of the support, rotatable shafts extending longitudinally of the craft, said shafts being connected to said support for swinging movement in a longitudinal plane in response to swinging movement of the support, the weight having drive means thereon and the shafts having individual driven means drivingly connected respectively to the weight drive means whereby lateral swinging of the weight to a dynamically balanced condition in certain maneuvering of the craft results in rotation of said shafts, the drive ratios of said weight drive to said respective driven means being different whereby the shaft motions are unequal.

8. An instrument for aircraft of the type described, comprising a fixture adapted to be mounted in predetermined position on said craft, having a support pivotally mounted thereon on an axis transverse the length of the craft, a weight pivotally mounted on said support on an axis longitudinal of the length of the craft for swinging movement laterally of the same under the influence of gravity or centrifugal force in maneuvering, indicator members actuated by said support for swinging movement as a unit in a plane longitudinal of the length of the craft, actuator means on said weight shiftable therewith in the movement thereof, and individual actuated members comprising coaxial shafts connected respectively to said indicator members and drivingly connected to said actuator means in different drive ratios, whereby the movements of said indicator members are unequal.

9. A combined attitude and angle of climb or descent indicating instrument for aircraft comprising a fixture adapted to be mounted in predetermined position on the craft and having an oscillating support pivotally mounted thereon on a horizontal axis transverse the length of the craft for swinging movement in a longitudinal plane, said support having a weight pivotally mounted thereon on an axis transverse the axis of the support, coaxial outer and inner telescoped rotatable shafts extending longitudinally of the craft, said shafts being connected to said support for swinging movement in a longitudinal plane in response to swinging movement of the support, the weight having drive means thereon and the shafts having individual driven means drivingly connected respectively to the weight drive means whereby lateral swinging of the weight to a dynamically balanced condition in certain maneuvering of the craft results in rotation of said shafts, the drive ratios of said weight drive to said respective driven means being different whereby the shaft motions are unequal, and a normally vertical indicator member at the free end of one shaft, and a normally horizontal indicator member at the free end of the other shaft.

10. A combined attitude and angle of climb or descent indicating instrument for aircraft comprising a fixture adapted to be mounted in predetermined position on the craft and having an oscillating support pivotally mounted thereon on a horizontal axis transverse the length of the craft for swinging movement in a longitudinal plane, said support having a weight pivotally mounted thereon on an axis transverse the axis of the support, rotatable shafts extending longitudinally of the craft, said shafts being connected to said support for swinging movement in a longitudinal plane in response to swinging movement of the support, the weight having drive means thereon and the shafts having individual driven means drivingly connected respectively to the weight drive means whereby lateral swinging of the weight to a dynamically balanced condition in certain maneuvering of the craft results in rotation of said shafts, the drive ratios of said weight drive to said respective driven means being different whereby the shaft motions are unequal, and a normally vertical indicator member at the free end of one shaft, and a normally horizontal indicator member at the free end of the other shaft.

ROGER E. LORENZEN.